(12) United States Patent
Wingo et al.

(10) Patent No.: US 8,768,402 B1
(45) Date of Patent: Jul. 1, 2014

(54) METHOD AND SYSTEM FOR CONTROLLING TRANSMIT POWER LEVELS

(75) Inventors: Louie E. Wingo, Liberty, MO (US); Cesar Perez, Olathe, KS (US); Trevor D. Shipley, Olathe, KS (US); Craig Sparks, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 229 days.

(21) Appl. No.: 13/421,099

(22) Filed: Mar. 15, 2012

(51) Int. Cl.
*H04W 52/24* (2009.01)
*H04W 52/36* (2009.01)

(52) U.S. Cl.
USPC .......................... 455/522; 455/69; 455/456.6

(58) Field of Classification Search
CPC .............................. H04W 52/24; H04W 52/36
USPC ................. 455/522, 69, 456.1, 452.1, 452.2, 455/456.6, 517, 67.11, 574, 126, 127.1; 370/318
See application file for complete search history.

(56) References Cited

U.S. PATENT DOCUMENTS

| | | | |
|---|---|---|---|
| 6,490,460 B1 * | 12/2002 | Soliman | 455/522 |
| 6,628,637 B1 | 9/2003 | Li et al. | |
| 6,657,976 B1 * | 12/2003 | Larghi | 455/522 |
| 7,260,415 B1 * | 8/2007 | Oh | 455/522 |
| 2009/0312005 A1 * | 12/2009 | Mukundan et al. | 455/422.1 |

* cited by examiner

*Primary Examiner* — John J Lee

(57) ABSTRACT

A mobile station stores power-limit data that identifies one or more defined locations and associates each defined location with a respective transmit power limit. The one or more defined locations may, for example, correspond to locations of high-priority signal transmitters, such as transmitters that transmit signals used for public safety communications. In response to a trigger condition, the mobile station determines whether its current location is proximate to any of the one or more defined locations in the power-limit data. The trigger condition may occur when a current transmit power level of the mobile station is greater than or equal to a predetermined threshold value. If the mobile station's current location is proximate to a defined location in the power-limit data, the mobile station controls its transmit power level so that it does not exceed a transmit power limit associated with the defined location.

18 Claims, 3 Drawing Sheets

METHOD AND SYSTEM FOR CONTROLLING TRANSMIT POWER LEVELS

BACKGROUND

A mobile station may transmit reverse link signals to a wireless network and may receive forward link signals from the wireless network. These forward link signals and reverse link signals may be power controlled in order to maintain a particular signal quality. To control the power level at which the mobile station transmits reverse link signals, the wireless network may determine the signal quality of the reverse link signals that it receives and then compare the signal quality to a target. If the signal quality is above the target, the wireless network may instruct the mobile station to reduce its transmit power level (e.g., by transmitting a power-down instruction to the mobile station). If the signal quality is below the target, the wireless network may instruction the mobile station to increase its transmit power level (e.g., by transmitting a power-up instruction to the mobile station).

OVERVIEW

In a first principal aspect, a method is provided. A mobile station transmits reverse link signals to a wireless network at a transmit power level that is controllable between a minimum transmit power level and a maximum transmit power level. The mobile station detects a trigger condition. In response to the trigger condition, the mobile station (i) accesses power-limit data that identifies one or more defined locations and associates each defined location with a respective transmit power limit, wherein each transmit power limit is less than the maximum transmit power level and is greater than or equal to the minimum transmit power level, and (ii) determines whether a current location of the mobile station is proximate to any of the one more defined locations in the power-limit data. In response to a determination that the current location is proximate to a defined location in the power-limit data, the mobile station controls the transmit power level so that it does not exceed a transmit power limit associated with the defined location.

In a second principal aspect, a mobile station is provided. The mobile station includes a communication interface for transmitting reverse link signals to a wireless network at a transmit power level and for receiving forward link signals from the wireless network. The transmit power level is controllable between a minimum transmit power level and a maximum transmit power level. The mobile station further includes a processor and data storage. Stored in the data storage is power limit data that identifies one or more defined locations and associates each defined location with a respective transmit power limit. Each transmit power limit is less than the maximum transmit power level and greater than or equal to the minimum transmit power level. Also stored in the data storage are program instructions that are executable by the processor to cause the mobile station to perform functions. The functions include: (a) detecting a trigger condition; (b) in response to the trigger condition, determining whether a current location of the mobile station is proximate to any of the one or more defined locations in the power-limit data; and (c) if the current location is proximate to a defined location in the power-limit data, controlling the transmit power level so that it does not exceed a transmit power limit associated with the defined location.

DETAILED DESCRIPTION

1. Overview

Figure 1:
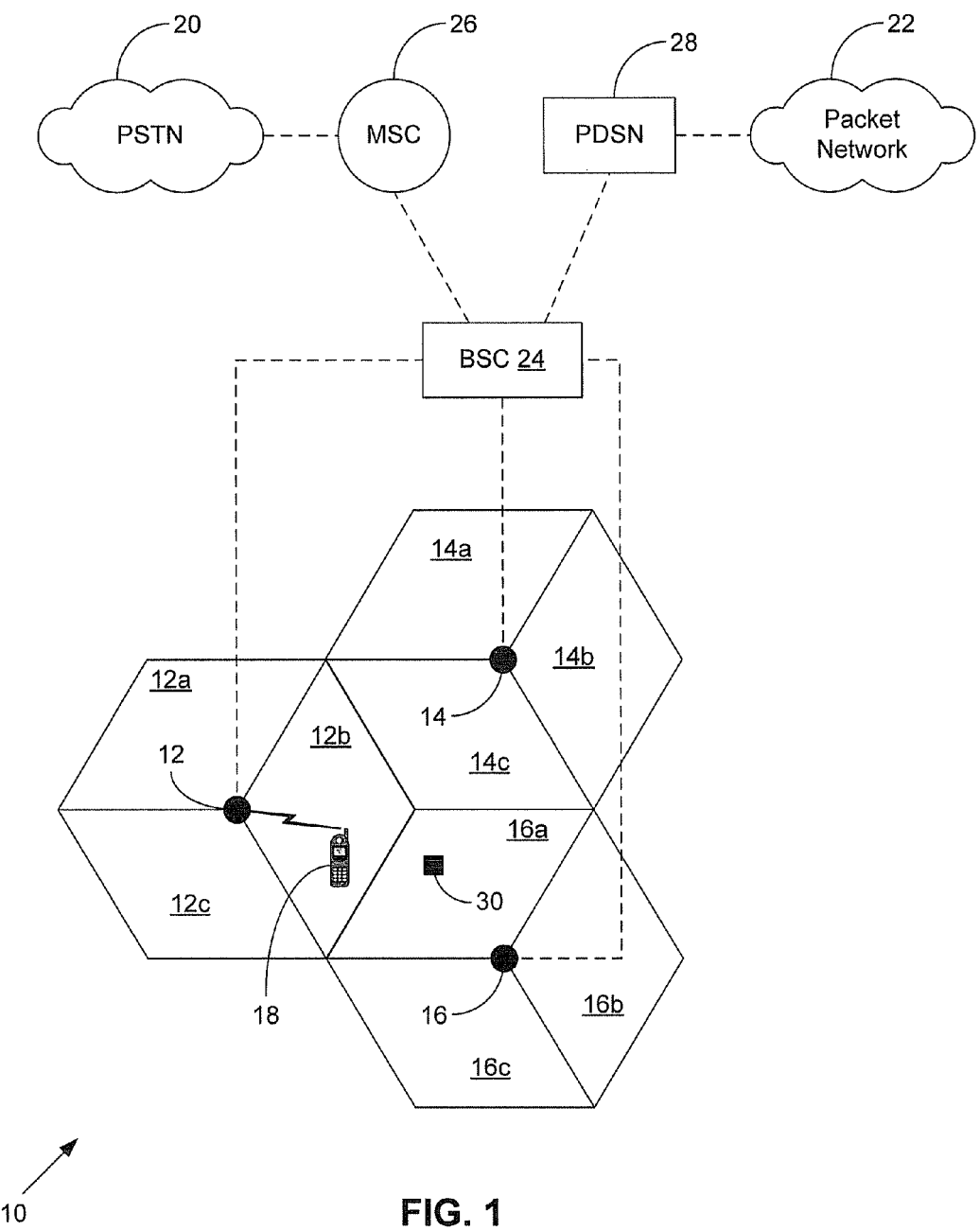
FIG. 1 is a schematic diagram of a wireless telecommunications network, in accordance with an example embodiment.

The inventors have recognized that conventional power control procedures can result in situations where mobile stations transmit at power levels that are sufficient to cause interference with other wireless systems. The wireless systems that experience such interference could be, for example, base stations or access points in other wireless networks, such as cellular wireless networks or wireless local area networks (WLANs). Of particular concern are situations in which mobile stations could potentially cause interference with wireless systems that are used for public safety communications. Such public safety communications could involve, for example, wireless communications used by police, firefighters, ambulances, or other emergency service providers.

In order to address such interference concerns, the inventors propose power control procedures in which mobile stations apply transmit power limits. The transmit power limits may be associated with locations of transmitters or other components of wireless systems that may potentially experience interference by the wireless transmissions of mobile stations. The transmit power limits may be included in power-limit data that may be stored in or accessed by mobile stations. The power-limit data may identify one or more defined locations and may associate each defined location with a respective transmit power limit. The defined locations may include the locations of transmitters that transmit high-priority signals, such as signals used for public safety communications.

When a mobile station detects a trigger condition, the mobile station may determine whether its current location is proximate to any of the one or more defined locations in the power-limit data. In response to a determination that its current location is proximate to a defined location in the power-limit data, the mobile station may control its transmit power level so that it does not exceed the transmit power limit associated with that defined location. In this way, a mobile station may limit its transmit power to a level that is less likely to cause interference with one or more other wireless systems.

The trigger condition could be detected as a result of the mobile station monitoring its transmit power level. For example, the mobile station may compare its current transmit power level to a predetermined threshold value. The mobile station may detect the trigger condition when the current transmit power level is greater than (or, in some cases, equal to) the predetermined threshold value. The mobile station may also take into account power control instructions that it receives from wireless network. For example, a trigger condition may be detected when the mobile station receives an instruction to increase its transmit power level to a level that it is greater than (or, in some cases, equal to) the predetermined threshold value. Other types of trigger conditions could also be used.

A mobile station may monitor its transmit power level in this way at all times, or the mobile station may monitor its transmit power level when particular circumstances are present. For example, the mobile station may monitor its transmit power level when it is operating at certain frequencies and/or when it is in communication with certain types of wireless systems. A mobile station may determine that it is in communication with a wireless system that calls for transmit power level monitoring based on the system's base station ID, system identification (SID), network identification (NID), pseudonoise (PN) offset, or other identifying information. A mobile station may also monitor its transmit power level in response to receiving an instruction from the wireless network.

When a mobile station detects a trigger condition, the mobile station may make a determination of its current location, or the mobile station may use a previously determined location as its current location. To determine its current location, the mobile station may use a satellite-based positioning system, such as the Global Positioning System (GPS). Alternatively or additionally, the mobile station may determine its current location using one or more terrestrial signal sources, such as signals transmitted by base stations. The current location that is determined by the mobile station could be in the form of latitude/longitude coordinates, in the form of a street address, or in some other form. In some cases, the current location could be given as simply the cell or sector in which the mobile station is currently operating.

Whatever its form or how it is obtained, the mobile station may compare its current location with the one or more defined locations in the power-limit data to determine proximity. The proximity determination could be based on whether the current location is within a defined distance of any of the defined locations. The defined distance could be a standard distance that applies to all locations. Alternatively, the defined distance could be different for different defined locations. For example, the power-limit data may include a respective defined distance for each defined location.

If the mobile station determines that it is proximate to a defined location in the power-limit data, then the mobile station may control its transmit power level so that it does not exceed the transmit power limit that is associated with the defined location. This may result in the mobile station reducing its transmit power level down to the transmit power limit and/or ignoring power control instructions that would increase its transmit power level over the transmit power limit.

In some cases, limiting transmit power in this way may affect the mobile station's functionality. For example, the mobile station might drop an on-going communication session, or the mobile station might continue an on-going communication session at a lower data transfer rate or at a lower quality of service. In addition, certain types of communication services may be unavailable or may be difficult to access. For example, the mobile station may be less likely to originate a call successfully when its transmit power level is limited. Nonetheless, reducing the potential of causing interference with other wireless systems may justify such reductions in a mobile station's performance or functionality. Moreover, a mobile station may be able take actions that minimize the effects of a transmit power limit. For example, a mobile station may be able to change to a different frequency or to a different wireless network in order to avoid transmit power limitations.

2. Example Network

FIG. 1 is a schematic diagram illustrating a wireless telecommunications network 10, in which exemplary embodiments may be employed. In this example, network 10 includes a plurality of base transceiver stations (BTSs), which are exemplified in FIG. 1 by BTSs 12, 14, and 16. Each BTS may radiate to define one or more wireless coverage areas. For example, as shown in FIG. 1, each BTS may include a set of directional antennas to define a plurality of sectors. Thus, BTS 12 provides wireless coverage in sectors 12a, 12b, and 12c; BTS 14 provides wireless coverage in sectors 14a, 14b, and 14c; and BTS 16 provides wireless coverage in sectors 16a, 16b, and 16c. It is to be understood that the configuration of sectors shown in FIG. 1 is intended to be schematic only. The actual size and/or shape of a given sector could be different than shown in FIG. 1. Moreover, whereas FIG. 1 shows well-defined boundaries between sectors, it is to be understood that the wireless coverage provided by different sectors could be overlapping, coextensive, or one sector may be encompassed within another sector.

Within a given sector, a BTS may wirelessly communicate with one or more mobile stations. For example, FIG. 1 shows a mobile station 18 in wireless communication with BTS 12 while operating in sector 12b. Mobile station 18 could be a wireless telephone, a wireless handheld computer, a wireless tablet computer, a wirelessly-equipped notebook computer, or some other type of wireless communication device. The wireless communications between mobile station 18 and BTS 12 may include forward link signals that BTS 12 transmits to mobile station 18 and/or reverse link signals that mobile station 18 transmits to BTS 12. The forward link signals and reverse link signals may conform to a wireless protocol, such as 1xRTT CDMA, EVDO, GSM/GPRS, UMTS, LTE, WiMAX, or any other wireless protocol that has been or may be developed.

Although FIG. 1 shows mobile station 18 in wireless communication with BTS 12, in some embodiments, mobile station 18 may be able to wirelessly communicate with multiple BTSs. For example, while operating in sector 12b, mobile station 18 may be able to wirelessly communicate with BTS 14 and/or BTS 16, in addition to BTS 12. Moreover, as a mobile device, mobile station 18 may move from one location to another, in which case mobile station 18 may change its wireless connectivity with network 10. For example, mobile station 18 may move from sector 12b into sector 14c, where mobile station 18 may communicate with BTS 14, or mobile station 18 may move from sector 12b into sector 16a, where mobile station 18 may communicate with BTS 16.

The wireless communications between mobile station 18 and BTS 12 may involve a communication session between mobile station 18 and one or more endpoints, such as landline telephones, wireless telephones, e-mail servers, Web servers, media servers, gaming servers, or other types of communication devices. Such communication sessions may involve the exchange of voice, text, video, data, or other media. To support such communication sessions, wireless telecommunications network 10 may be communicatively coupled to (or include) one or more circuit-switched networks, exemplified in FIG. 1 by public switched telephone network (PSTN) 20, and/or one or more packet-switched networks, exemplified in FIG. 1 by packet network 22. Packet network 22 could include one or more public data networks, such as the Internet, and/or one or more private data networks.

BTSs 12, 14, and 16 could be communicatively coupled to PSTN 20 and/or packet network 22 in various ways. In the example illustrated in FIG. 1, BTSs 12, 14, and 16 are communicatively coupled to a base station controller (BSC) 24. BSC 24 is communicatively coupled to PSTN 20 via a mobile switching center (MSC) 26, and BSC 24 is communicatively coupled to packet network 22 via a packet data serving node (PDSN) 28. In this way, wireless telecommunications network 10 may support communication sessions between mobile station 18 and one or more endpoints connected to PSTN 20 and/or packet network 22.

Within the wireless coverage area provided by wireless telecommunications network 10 may be located one or more wireless systems that are vulnerable to interference from the wireless transmissions of mobile stations, such as mobile station 18. For example, FIG. 1 shows a wireless system 30 located in sector 16a. Wireless system 30 may represent a transmitter, such as a transmitter of high-priority wireless signals used for public safety communications. In order to reduce the potential for interference, wireless system 30 may be associated with a transmit power limit that may be applied by mobile station that are operating in locations that are proximate to wireless system 30. The transmit power limit associated with wireless system 30 could be set forth in power-limit data that may be stored in or accessed by mobile stations, such as mobile station 18.

A mobile station may be proximate to wireless system 30 when it is within a defined distance of wireless system 30. The defined distance could extend into neighboring sectors, such as sector 12b and 14c. Thus, mobile station 18 operating in sector 12b could be within the defined distance of wireless system 30 so as to apply with the transmit power limit associated with wireless system 30.

Alternatively, the defined distance could be entirely within sector 16a. In that case, mobile station 18 would not apply the transmit power limit associated with wireless system 18 when operating in sector 12b. However, if mobile station 18 moves into sector 16a, then mobile station 18 might operate within the defined distance of wireless system 30 and be subject to the transmit power limit. In some cases, the defined distance could be sector-based. For example, sector 16a containing wireless system 30 could be identified in the power-limit data as a power-limited sector. In that case, the transmit power limit associated with wireless system 30 may be applied to any mobile station having sector 16a as its serving sector.

Although FIG. 1 shows only one wireless system that is associated with a transmit power limit, it is to be understood that a wireless telecommunications network may include multiple wireless systems within its wireless coverage area, and each such wireless system may be associated with a respective transmit power limit.

3. Example Methods

Figure 2:
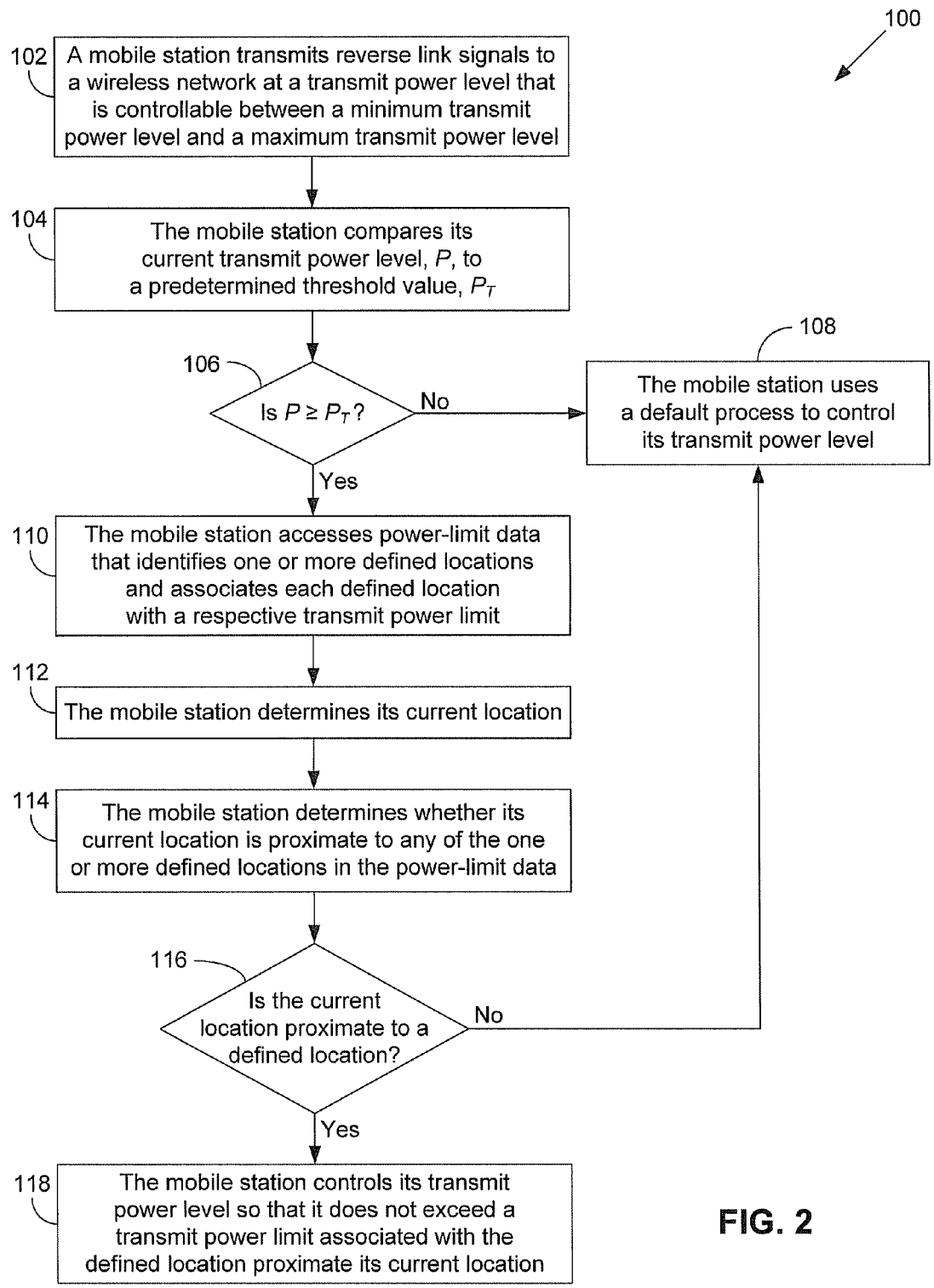
FIG. 2 is a flow chart illustrating a method of controlling transmit power levels, in accordance with an example embodiment.

FIG. 2 is a flowchart illustrating an example method 100 for controlling a mobile station's transmit power level. For purposes of illustration, method 100 is described with reference to wireless telecommunications network 10 illustrated in FIG. 1. It is to be understood, however, that other network architectures could be used.

Method 100 may be performed when a mobile station (e.g., mobile station 18) transmits reverse link signals to a wireless network (e.g., base station 12 in wireless telecommunications network 10) at a transmit power level that is controllable between a minimum transmit power level and a maximum transmit power level, as indicated by block 102. In an example embodiment, the mobile station controls its transmit power level in response to power control instructions from the wireless network. For example, in response to a power-up instruction from the wireless network, the mobile station may increase its transmit power level (up to the maximum transmit power level). In response to a power-down instruction from the wireless network, the mobile station may decrease its transmit power level (down to the minimum transmit power level).

The reverse link signals that are power controlled in this way may be signals that the mobile station transmits during a communication session, such as a voice call. The mobile station may also receive forward link signals from the wireless network during the communication session, and the mobile station may transmit power control instructions to the wireless network in order to control the transmit power level at which the wireless network transmits the forward link signals. The power control of the forward link and reverse link signals may be performed in order to maintain a particular signal quality of these signals.

While the mobile station is transmitting the reverse link signals, the mobile station monitors the power level at which it transmits the reverse link signal in order to determine whether a trigger condition exists. In this example, the monitoring involves the mobile station comparing its current transmit power level, P, to a predetermined threshold value, $P_T$, as indicated by block 104. Whether a trigger condition exists may depend on whether the current transmit power level is greater than or equal to the predetermined threshold value (in other words, whether $P \geq P_T$), as indicated by block 106.

If the current transmit power level is less than the predetermined threshold value, then the mobile station may use a default process to control its transmit power level, as indicated by block 108. The default process could be a processes in which the mobile station adjusts its transmit power level in response to power control instructions from the wireless network, such that the mobile station's transmit power level could be adjusted to be any level from the minimum transmit power level to the maximum transmit power level.

On the other hand, if the current transmit power level is greater than or equal to the predetermined threshold value, the mobile station may determine that a trigger condition exists. In response, the mobile station may access power-limit data that identifies one or more defined locations and associates each defined location with a respective transmit power limit, as indicated by block 110. In this example, each of the transmit power limits in the power-limit data is less than the maximum transmit power level and is greater than or equal to the minimum transmit power level.

The power-limit data could be stored in a memory of the mobile station. Thus, the mobile station may access the power-limit data by accessing its memory. Alternatively, the power-limit data might be stored outside of the mobile station, such as in the wireless network. In that case, the mobile station may access the power-limit data by querying the wireless network.

The one or more defined locations in the power-limit data may correspond to locations of wireless systems that are vulnerable to interference cause by the mobile station's reverse link signals. To determine whether interference with any of these wireless systems is a potential issue, the mobile station may determine its current location, as indicated by block 112, and determine whether its current location is proximate to any of the one or more defined locations in the power-limit data, as indicated by block 114.

To determine its current location, the mobile station may use any type of location determination methodology, such as GPS, forward link triangulation, inertial navigation, or any combination thereof. In some cases, the mobile station may determine its current location in response to detecting the trigger condition. For example, after detecting the trigger condition, the mobile station may obtain a GPS location fix. Alternatively, the mobile station may use a previously-determined location as its current location. For example, after detecting the trigger condition, the mobile station may access a GPS location fix that the mobile station obtained shortly before detecting the trigger condition.

To determine whether its current location is proximate to any of the one or more defined locations in the power-limit data, the mobile station may determine whether its current location is within a defined distance of any of the of the defined locations. Thus, the defined location could be a point location (such as latitude and longitude coordinates) and the defined distance could be a radial distance from that point location. In that case, the transmit power limit associated with the defined location may be applied to any mobile station operating within a given circle around the defined location, wherein the radius of the given circle corresponds to the defined distance.

However, the geographic extent of a transmit power limit associated with a defined location need not be circular. For example, due to the terrain around a defined location, the transmit power limit might extend farther in some directions than others. Thus, instead of a point location, a defined location in the power-limit data may be a region that corresponds to the geographic extent of its associated transmit power limit. The power-limit data may describe a defined location as a region in various ways. In one possible approach, the power-limit data may identify the defined location as a power-limited sector. In that case, the mobile station may determine whether it is proximate to a defined location by determining whether its current serving sector corresponds to a power-limited sector in the power-limit data.

Whether the mobile station limits its transmit power level or whether it applies a default power control process may depend on whether its current location is proximate to any of the one or more defined locations in the power-limit data, as indicated by block 116. If the current location is not proximate to any of the defined locations, then the mobile station may apply the default power control process, as described above for block 108.

However, if the current location is proximate to a defined location, the mobile station controls its transmit power level so that it does not exceed the transmit power limit associated with that defined location, as indicated by block 118. Because each of the transmit power limits in the power-limit data is less than the maximum transmit power level, the transmit power limit that is applied in block 118 may result in the mobile station transmitting reverse link signals at power levels that are less than what the mobile station would otherwise use. This reduction in transmit power levels may beneficially reduce the potential for the mobile station causing interference with other wireless systems.

4. Example Mobile Station

Figure 3:
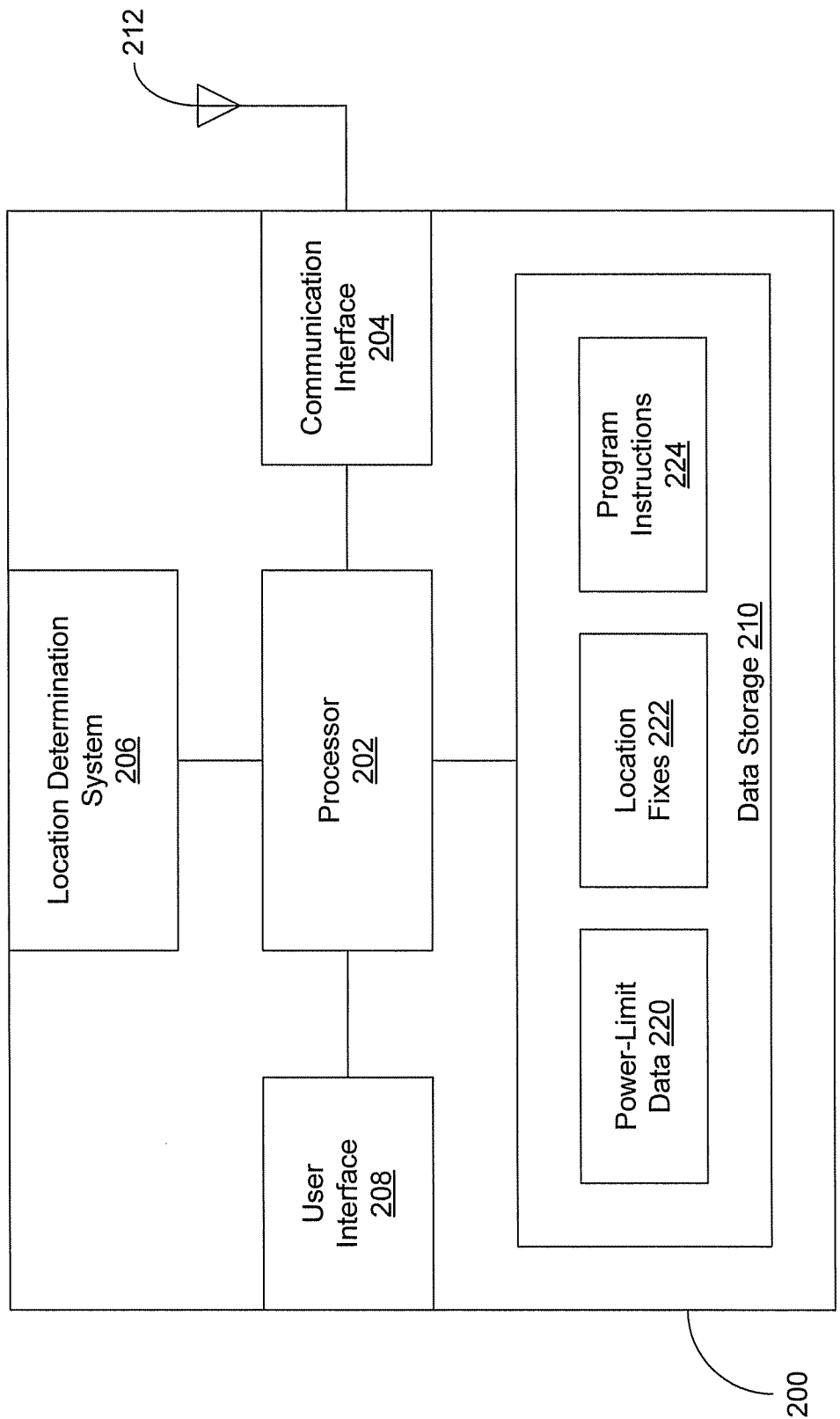
FIG. 3 is a block diagram of a mobile station, in accordance with an example embodiment.

FIG. 3 illustrates an example mobile station 200 that may be operable to perform method 100 shown in FIG. 2. Mobile station 200 includes a processor 202 that is coupled to a communication interface 204, to a location determination system 206, to a user interface 208, and to data storage 210.

Communication interface 204 may include a transmitter for wirelessly transmitting reverse link signals to a wireless network and a receiver for wirelessly receiving forward link signals transmitted by the wireless network. In some cases, the transmitter and receiver could be integrated together as a transceiver. Communication interface 204 may transmit and receive wireless signals via one or more antennas, exemplified in FIG. 3 by antenna 212. Communication interface 204 may transmit reverse link signals at a transmit power level that is controllable between a minimum transmit power level and a maximum transmit power level. The transmit power level of the reverse link signals transmitted by communication interface 204 may be controlled by processor 202.

Location determination system 206 could be any system that mobile station 200 may use to determine its location. For example, location determination system 206 may include a GPS receiver. Alternatively or additionally, location determination system 206 may be able to determine location based on forward link signals received by communication interface 204.

User interface 208 is configured to receive input from the user and to convey output from the user. For instance, user interface 208 may include a touch screen, a keypad, buttons, and or other controls for receiving input from the user. User interface 208 may also include a display screen for displaying textual and/or graphical information to the user. In addition, user interface 208 may include a microphone and speaker for voice communication.

Data storage 210 may include any type of non-transitory computer readable medium, such as random access memory (RAM), read-only memory (ROM), flash memory, cache memory, one or more magnetically encoded disks, one or more optically encoded disks, and/or any other type of volatile or non-volatile memory. Data storage 210 may store various kinds of data, such as power-limit data 220. As described above, power-limit data 220 may identify one or more defined locations (e.g., locations of wireless systems that are potentially vulnerable to interference from mobile station 200) and may associate each defined location with a respective transmit power limit that is less than the maximum transmit power level of communication interface 204 and greater than or equal to the minimum transmit power level of communication interface 204.

Power-limit data 220 may be obtained by mobile station 200 in various ways. For example, power-limit data 220 may be provisioned into mobile station 200 at the time of service activation. Power-limit data 220 may then be updated at various times, such as by using over-the-air-provisioning (OTAP) methods. Such updates to power-limit data 220 may, for example, occur in conjunction with updates to a preferred roaming list (PRL) used by mobile station 200.

Alternatively, mobile station 200 may receive power-limit data 220 from the wireless network in one or more overhead messages (e.g., in conjunction with neighbor list messages). In this approach, mobile station 200 may receive different power-limit data depending on where the mobile station is operating. Mobile station 200 could also receive power-limit data 220 in other ways.

Data storage 210 may also store other types of data, such as one or more location fixes obtained by location determination system 206. In addition, data storage 210 may store program instructions 224 that are executable by processor 202 to control the functioning of mobile station 200. For example, program instructions 224 may be executable by processor 202 to cause mobile station 200 to perform the functions illustrated in FIG. 2 and described above. Those functions may include: (a) detecting a trigger condition (e.g., based on a comparison of the current transmit power level used by communication interface 204 with a predetermined threshold value); (b) in response to a trigger condition, determining whether a current location (e.g., a location obtained by location determination system 206) is proximate to any of the one or more defined locations in the power-limit data 220; and (c) if the current location is proximate to a defined location in the power-limit data 220, controlling the transmit power level used by communication interface 204 so that it does not exceed the transmit power limit associated with the defined location.

5. Conclusion

Example embodiments of the present invention have been described above. Those skilled in the art will understand, however, that changes and modifications may be made to these embodiments without departing from the true scope and spirit of the invention, which is defined by the claims.

What is claimed is:

1. A method comprising:
a mobile station transmitting reverse link signals to a wireless network at a transmit power level that is controllable between a minimum transmit power level and a maximum transmit power level;
said mobile station detecting a trigger condition, wherein said mobile station detecting said trigger condition comprises said mobile station comparing a current transmit power level to a predetermined threshold value;
in response to said trigger condition, said mobile station (i) accessing power-limit data that identifies one or more defined locations and associates each defined location with a respective transmit power limit, wherein each transmit power limit is less than said maximum transmit power level and greater than or equal to said minimum transmit power level, and (ii) determining whether a current location of said mobile station is proximate to any of said one or more defined locations in said power-limit data; and
in response to a determination that said current location is proximate to a defined location in said power-limit data, said mobile station controlling said transmit power level so that it does not exceed a transmit power limit associated with said defined location.

2. The method of claim 1, wherein said mobile station detecting said trigger condition further comprises said mobile station determining that said current transmit power level is greater than or equal to said predetermined threshold value.

3. The method of claim 1, wherein said mobile station detecting said trigger condition further comprises said mobile station receiving an instruction to increase said current transmit power level to be greater than said predetermined threshold value.

4. The method of claim 1, wherein said current location comprises a latitude and longitude position.

5. The method of claim 4, wherein said mobile station obtains said latitude and longitude position using a satellite positioning system.

6. The method of claim 4, wherein said mobile station obtains said latitude and longitude position in response to said trigger condition.

7. The method of claim 4, wherein said one or more defined locations comprise locations of one or more high-priority signal transmitters.

8. The method of claim 7, wherein said one or more high-priority signal transmitters transmit signals used for public safety communications.

9. The method of claim 7, wherein said mobile station determining whether said current location is proximate to any of said one or more defined locations comprises said mobile station determining whether said latitude and longitude position is within a defined distance of any of said one or more high-priority transmitters.

10. The method of claim 1, wherein said current location comprises an identification of a serving sector of said wireless network that is currently serving said mobile station.

11. The method of claim 10, wherein said one or more defined locations comprise one or more identifications of one or more power-limited sectors of said wireless network.

12. The method of claim 11, wherein said one or more power-limited sectors comprise sectors in which one or more high-priority transmitters are located.

13. The method of claim 11, wherein said mobile station determining whether said current location is proximate to any of said one or more defined locations comprises said mobile station determining whether said serving sector corresponds to any of said one or more power-limited sectors.

14. The method of claim 1, further comprising:
said mobile station receiving said power-limit data from said wireless network.

15. A mobile station, comprising:
a communication interface for transmitting reverse link signals to a wireless network at a transmit power level and for receiving forward link signals from said wireless network, wherein said transmit power level is controllable between a minimum transmit power level and a maximum transmit power level;
a processor;
data storage;
power-limit data stored in said data storage, wherein said power-limit data identifies one or more defined locations and associates each defined location with a respective transmit power limit, wherein each transmit power limit is less than said maximum transmit power level and greater than or equal to said minimum transmit power level; and
program instructions stored in said data storage, wherein said program instructions are executable by said processor to cause said mobile station to perform functions, said functions comprising:
(a) detecting a trigger condition, wherein detecting said trigger condition comprises comparing a current transmit power level to a predetermined threshold value;
(b) in response to said trigger condition, determining whether a current location of said mobile station is proximate to any of said one or more defined locations in said power-limit data; and
(c) if said current location is proximate to a defined location in said power-limit data, controlling said transmit power level so that it does not exceed a transmit power limit associated with said defined location.

16. The mobile station of claim 15, further comprising:
a location determination system for determining said current location.

17. The mobile station of claim 16, wherein said location-determination system comprises a global positioning system (GPS) receiver.

18. The mobile station of claim 15, wherein said functions further comprise:
receiving said power-limit data from said wireless network.

* * * * *